United States Patent
Cardona et al.

(10) Patent No.: US 8,295,290 B2
(45) Date of Patent: Oct. 23, 2012

(54) ENERGY EFFICIENT CONTROL OF DATA LINK GROUPS

(75) Inventors: Omar Cardona, Austin, TX (US); James Brian Cunningham, Austin, TX (US); Baltazar De Leon, III, Austin, TX (US); Jorge Rafael Nogueras, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 12/553,158

(22) Filed: Sep. 3, 2009

(65) Prior Publication Data

US 2011/0051734 A1 Mar. 3, 2011

(51) Int. Cl.
*H04L 12/28* (2006.01)
*H04L 12/56* (2006.01)

(52) U.S. Cl. ........................................ 370/400

(58) Field of Classification Search ................. None
See application file for complete search history.

(56) References Cited

U.S. PATENT DOCUMENTS

| | | | |
|---|---|---|---|
| 6,594,265 B1 * | 7/2003 | Etorre et al. | 370/395.51 |
| 6,687,228 B1 * | 2/2004 | Fichou et al. | 370/232 |
| 6,690,678 B1 * | 2/2004 | Basso et al. | 370/468 |
| 6,874,147 B1 * | 3/2005 | Diamant | 719/328 |
| 7,062,595 B2 | 6/2006 | Lindsay et al. | |
| 7,275,175 B2 * | 9/2007 | Cardona et al. | 714/4.11 |
| 7,366,120 B2 | 4/2008 | Handforth et al. | |
| 7,389,462 B1 | 6/2008 | Wang et al. | |
| 2008/0084828 A1 * | 4/2008 | Gonzalez et al. | 370/252 |

OTHER PUBLICATIONS

V. Raghunathan et al, "Experience with a Low Power Wireless Mobil Computing Platform", ISLPED '04, Aug. 9-11, 2004, pp. 363-368. File name—p363-raghunathan.pdf.
V. Namboodri et al, "Toward Energy Efficient VoIP over Wireless LANs", MobiHoc '08, May 26-30, 2008, pp. 169-178. File name—p169-namboodiri.pdf.
P. Lettieri et al, "Adapter link layer strategies for energy efficient wireless networking" Wireless Networks 5, (1999), pp. 339-355. File name—p339-lettieri.pdf.
No Author Listed, "EtherChannel" (obtained at http://en.wikipedia.org/wiki/EtherChannel) undated. File name—EtherChannel-Wikipedia.pdf. Printed on Sep. 3, 2009.
No Author Listed, "Link aggregation" (obtained at http://en.wikipedia.org/wiki/Link_aggregation) undated. File name—Link aggregation-Wikipedia.pdf. Printed on Sep. 3, 2009.
No Author Listed, "Understanding Ether Channel Load Balancing and Redundancy on Catalyst Switches" (obtained at http://www.cisco.com/en/US/tech/tk389/tk213/technologies_tech_note09...) undated File name—Understanding EtherChannel.pdf. Printed on Sep. 3, 2009.

* cited by examiner

*Primary Examiner* — Ayaz Sheikh
*Assistant Examiner* — Blanche Wong
(74) *Attorney, Agent, or Firm* — Brevetto Law Group (57) ABSTRACT

Where parallel links between network devices are aggregated into link groups to support the transport of associated data streams, the link groups can be managed in an energy efficient manner by defining each link group as consisting of a primary link and one or more secondary links. The primary link in a link group remains enabled at all times but the secondary links are enabled only when needed and are disabled when no longer needed, minimizing power consumption for the secondary links (and the link group).

19 Claims, 7 Drawing Sheets

ENERGY EFFICIENT CONTROL OF DATA LINK GROUPS

BACKGROUND

The present invention relates to data flow between network devices in a computer network and more particularly to the energy efficient control of data link groups used for carrying data between network devices.

Link aggregation technology was developed to help achieve higher link speeds between network devices connected by parallel data links. Network devices normally have multiple input/output ports, each including a communication adapter that provides the interface between the network device and a data link.

Parallel data links are aggregated into link groups that share the data to be transported between two network devices. The aggregated capacity of a link group is, of course, greater than the data capacity of any of the individual data links in the group. For example, if five parallel 1 Gb/s Ethernet links are defined as members of the same link group, the aggregated link speed of the group is 5 Gb/s even though each member of the group remains limited to a 1 Gb/s link speed.

Known link aggregation technology requires that all links a defined link group remain enabled whenever the link group is in use, even where data traffic could be handled by less than all of the links in the link group.

SUMMARY

Each link in an operating link group consumes an amount of line power that is determined by adapter design and link speed. It is now known that a lightly loaded link in a known type of link group consumes nearly the same amount of power as a fully loaded link.

Embodiments of the invention provide energy efficient management of data flow between network devices over parallel data links where each of the devices has a plurality of communication adapters. The invention may be implemented as a computer-implemented method performed in at least one of the network devices. A link group is defined as including a primary communication adapter and one or more secondary communication adapters. The defined link group is initialized by enabling the primary communication adapter and disabling each of the secondary communication adapters. A periodic determination is made of the amount of data to be carried over the links in the defined work group. If one of the determinations shows that the amount of data to be carried satisfies a predetermined threshold condition related to the data capacity of the primary communication adapter, one or more of the secondary communication adapters is enabled. Only enabled adapters consume any significant amount of power.

The invention may also be embodied as a computer program product for controlling data flow over parallel data links between network devices where each network device has a plurality of communication adapters. The computer program product includes a computer usable storage medium for storing computer usable program code. The stored code includes code configured to define a link group including a primary communication adapter and one or more secondary communication adapters, code configured to initialize the defined link group by enabling the primary communication adapter and disabling each of the secondary communication adapters, code configured to periodically determine the amount of data to be carried over the links in the defined link group, and code configured to respond a determination that the amount of data to be carried satisfies a predetermined threshold condition related to the data capacity of the primary communication adapter by enabling one or more of the secondary communication adapters.

Further, the invention may be embodied as a computer-implemented system that includes a link group memory for storing a definition of at least one definition of a link group including a primary communication adapter and one or more secondary communication adapters. The system further includes a data flow detector for periodically determining the amount of data to be carried over a link group defined in the link group memory. The system also contains a communication adapter controller that initializes a defined link group by enabling the primary communication adapter and disabling each of the secondary communication adapters. The communication adapter controller also responds to a determination by the data flow detector that the amount of data to be carried by the defined link group satisfies a predetermined threshold condition related to the data capacity of the primary communication adapter by enabling one or more the secondary communication adapters.

BRIEF DESCRIPTION OF THE SEVERAL VIEWS OF THE DRAWINGS

FIG. 7, consisting of FIGS. 7A and 7B taken together, is a flow chart of operations that are performed to determine when links in a defined link group should be enabled or disabled when the link group is put into service to transport data between network devices vices.

DETAILED DESCRIPTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product recorded in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain or store the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
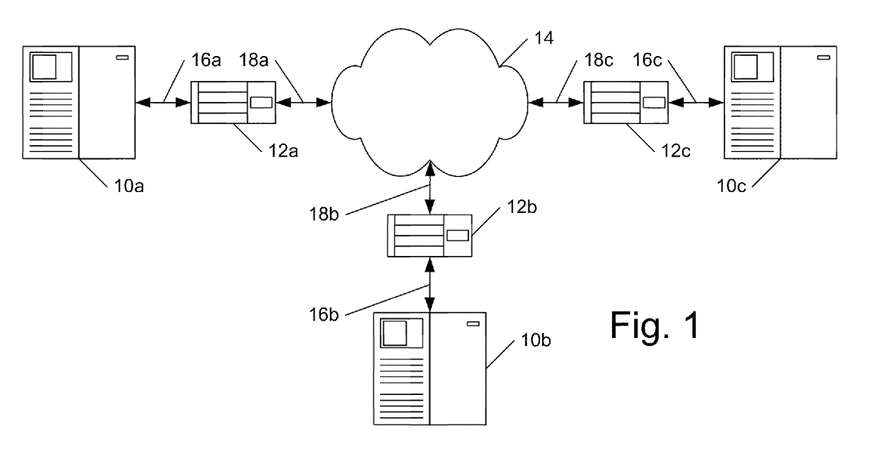
FIG. 1 is a high-level schematic representation of a computer network including multiple host systems.

Referring now to FIG. 1, a typical computer network includes a plurality of host systems, represented by systems 10a, 10b and 10c, which can exchange data with one another through a common wide area network 14. The host systems are typically connected to components within the wide area network 14 through intermediary devices, represented by network switches 12a, 12b and 12c with data links 16a, 16b and 16c connecting each of the host systems to one of the network switches and data links 18a, 18b and 18c providing interfaces between the network switches 12a, 12b and 12c and the wide area network 14. Different communication protocols may be implemented in different embodiments of the computer network shown generally in FIG. 1. For example, data may be exchanged between each host system and its associated network switch over data links that conform to the well-known Ethernet protocol.

While each host system to network switch connection is illustrated in FIG. 1 as if it were a single data link, it is not uncommon for a host to be connected to a network switch through parallel data links, each of which can transport data independently of other links.

Figure 2:
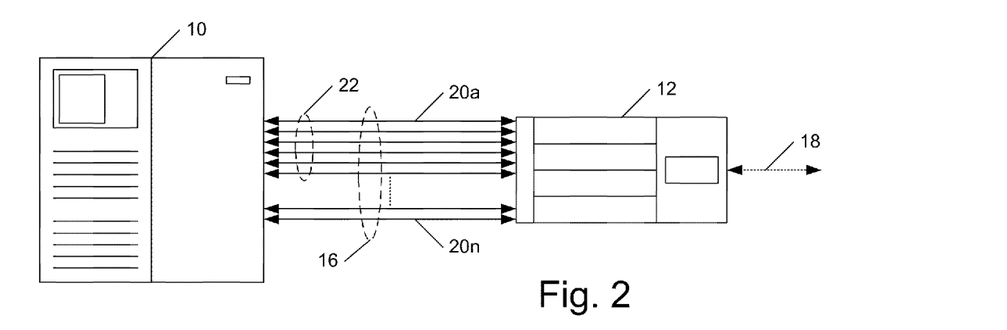
FIG. 2 is a schematic representation of a single host and network switch connected by parallel data links.

FIG. 2 illustrates a single host system 10 connected to a single network switch 12 through a set 16 of parallel data links 20a-20n. As already discussed, link aggregation technology now exists to combine subsets of available data links into link groups, such as link group 22, with each defined link group being dedicated to carrying a particular data stream between the host system 10 and the network switch 12. Depending upon the number of parallel data links that are available to satisfy the traffic requirements between the host system 10 and the network switch 12, multiple link groups may be defined.

Not every data link must necessarily be assigned to a defined to link group. If particular data traffic requirements between the host system 10 and the network switch 12 can be satisfied over a single data link, the data link will not be assigned to a link group.

Figure 3:
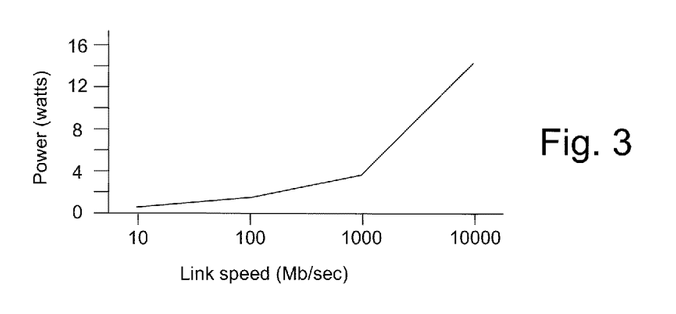
FIG. 3 is a graph showing power consumption of typical Ethernet adapters designed to operate at different line speeds.

A data link can generally be thought of as consisting of the link media (e.g., fiber optic cable or copper wire) terminating in communication adapters which provide the interface between the medium and a connected network device, such as host system 10 or network switch 12. The amount of power required to transport data over a data link depends, in part, on the design of the communication adapters and on the rated link speed (data capacity) of the communication adapters. FIG. 3 is a graph showing typical power consumption ratings for Ethernet adapters having rated capacities of 10 Mb/sec, 100 Mb/sec, 1000 Mb/sec (1 Gb/sec) and 10 Gb/sec. Not surprisingly, adapter power requirements increase when link speeds increase.

What is not appreciated that the fact that the power consumption of a communications adapter is not directly proportional to the amount of data being handled by that adapter at any given point in time. Even an idle adapter consumes some power in order to maintain the contents of configuration registers, etc. The amount of power required by an adapter does not increase in proportion to the amount of data being handled as the adapter becomes more heavily loaded.

In known link aggregation technologies, all data links in a defined link group remained enabled at all times without regard to the amount of data being carried by the link group. Using Ethernet technology as an example, Ethernet power consumption has an indirect impact on the cost of system operation. An idle link group becomes a hidden power cost if the links in the group not actually needed over a period of time. To provide energy efficient operation of defined link groups, the invention causes an individual link in a link group to be enabled only if the link is needed to satisfy current or projected data traffic requirements. If the link is not actually needed to satisfy current or projected data traffic requirements, the link remains in or is driven to a disabled state to minimize power consumption of the defined link group.

Figure 4:
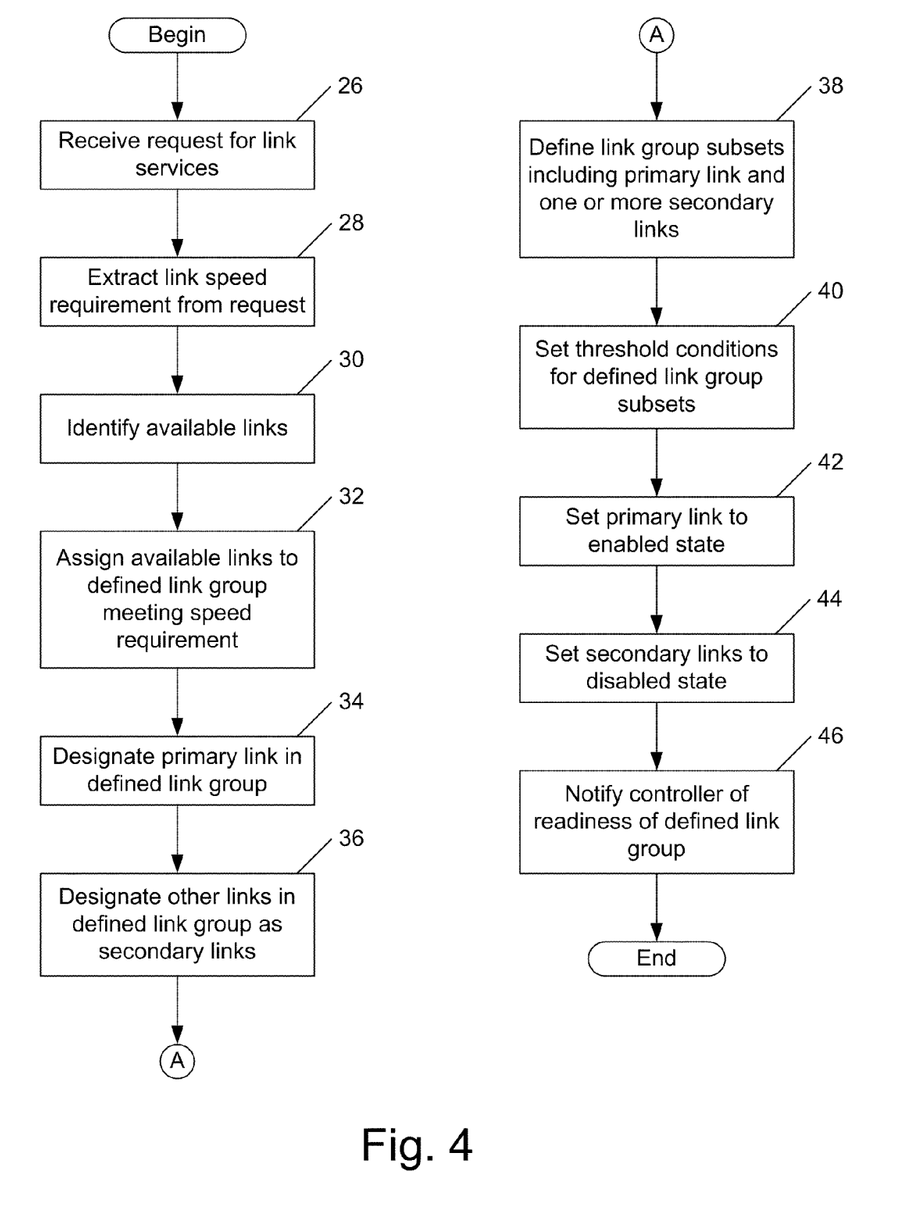
FIG. 4 is a flow chart of operations performed during an initialization process in one embodiment of the invention.

Defining a link group requires an initialization process, one embodiment of which is illustrated in FIG. 4. The initialization process begins when a network device that controls device data links receives a request (operation 26) for link services. The link services request will include link speed requirements that must be extracted (operation 28) from the request. Available data links are identified in an operation 30 and are assigned to a defined link group having enough aggregate data capacity to satisfy the link speed requirements extracted from the link services request. Details of how particular data links are chosen for inclusion in a defined link group may be significant from a system viewpoint but are omitted here as unnecessary to an understanding of the invention.

Once a defined link group has been created, one link in that group is identified as a primary link in an operation 34. The primary link in a defined link group remains enabled at all times without regard to current or projected data traffic requirements. Other links in the defined link group are designated as secondary links in an operation 36. Secondary links may or may not be enabled at any given time depending upon data traffic requirements.

Within a defined link group, subsets of links may be defined in an operation 38 with each subset including the primary link and one or more of the secondary links. Each subset will have a rated aggregate data capacity. Once the subsets are defined, threshold conditions for selecting or de-selecting each subset are determined in an operation 40. The primary link in the defined link group is enabled in an operation 42 while the secondary links in the defined link group are set to a disabled state in an operation 44. The network device controlling the data links is notified of the readiness of the defined link group to begin carrying data in an operation 46 to end the initialization process.

Figure 5:
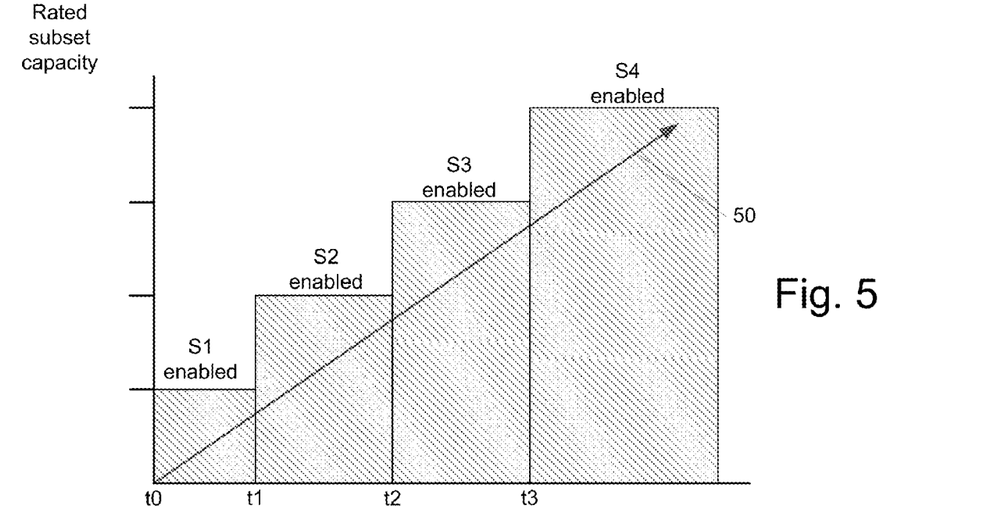
FIG. 5 is a graph illustrating the aggregate capacity of link group subsets and the conditions under which different subsets are selected as data rates increase.

Generally speaking, as data traffic rates increase, larger subsets of links are selected by enabling additional secondary links. An additional secondary link is enabled when the traffic rate passes a threshold value which is less than the maximum data capacity of the currently enabled subset. This is shown in FIG. 5 where line 50 is assumed to represent the actual (or projected) data traffic rate at different times t. As noted earlier, the primary link in a defined link group always remains enabled. In the drawing, link subset S1 consists of the primary link and is said to be enabled beginning at an initial time t0. At time t1, it is assumed that the data rate has reached a threshold value which is below the rated capacity (e.g., is 80% of the rated capacity) of the primary link. When the data rate reaches a threshold value for the primary link (link subset S1), the aggregate capacity of the defined link group is increased by enabling one of the disabled secondary links, thereby enabling link subset S2.

Similarly, it is assumed that the data rate at time t2 has reached the threshold value for link subset 2. When the data rate crosses the threshold, link subset S3 is enabled by enabling another secondary link in the link group, thereby increasing the available aggregate capacity of the link group. As long as there are still secondary links in the defined link group that have not yet been activated and as long as the data rate continues to get higher, successively larger link subsets can be enabled, as illustrated by the enablement of link subset S4 at time t3.

Figure 6:
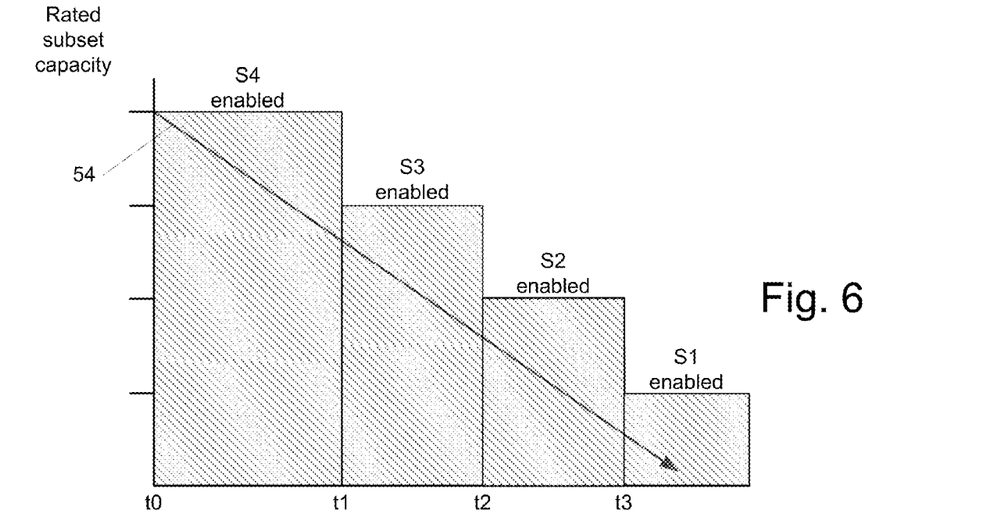
FIG. 6 is a graph illustrating the aggregate capacity of the same set of link group subsets and the conditions under which different subsets are selected as data rates decrease.

The same approach can be used to de-select secondary links (yielding smaller and smaller enabled link subsets) if the data rate decreases. This is shown in FIG. 6 where line 54 represents declining data traffic at different points in time. As data traffic falls, successively smaller link subsets are established (by disabling previously enabled secondary links) until only the primary link remains enabled. As previously noted, the primary link remains enabled even if the traffic rate approaches zero.

Figure 7A:
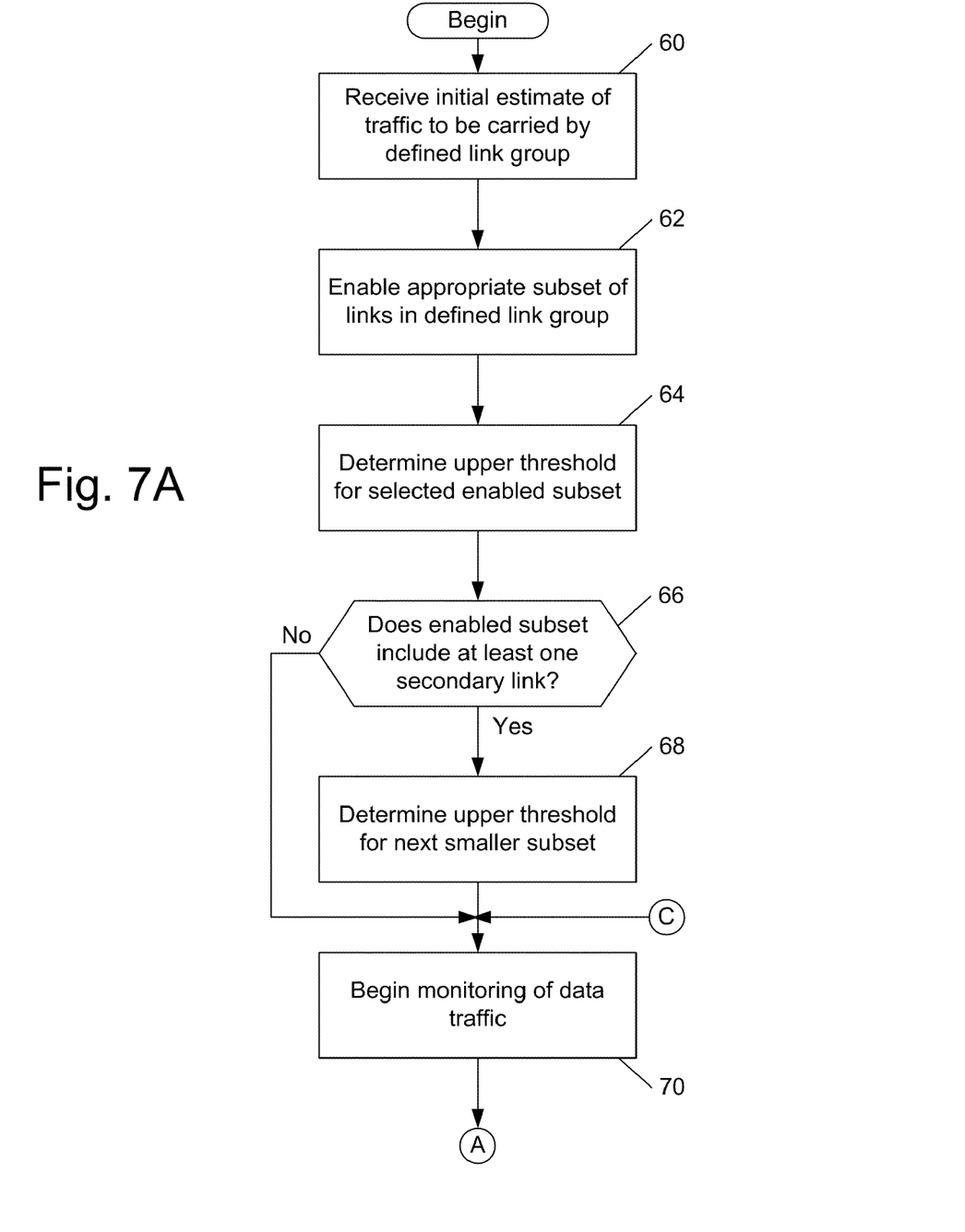
Figure 7B:
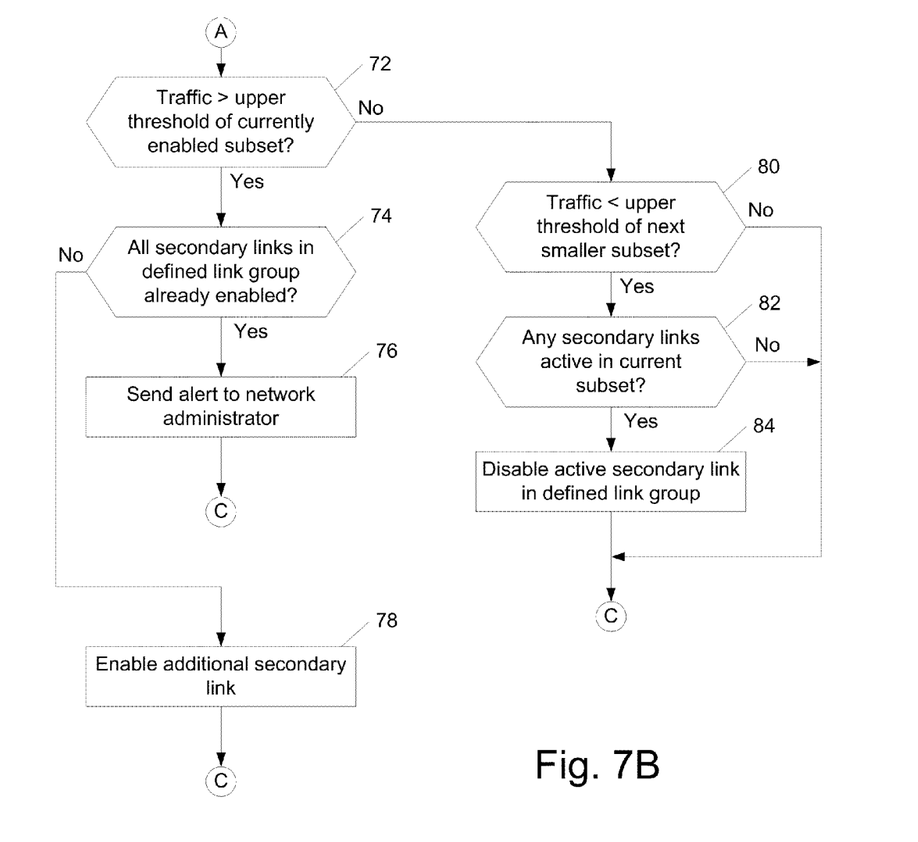

FIG. 7, consisting of FIGS. 7A and 7B taken together, is a flow chart of operations that are performed to determine when links in a defined link group should be enabled or disabled once the link group is put into service to transport data between network devices. Referring initially to FIG. 7A, the computer component (referred to generally as a communication adapter controller) that controls the operations of defined link groups is provided (operation 60) with an initial estimate of the traffic can be carried by defined link group.

The controller selects a subset of links in the defined link group appropriate for the initial traffic estimate and enables (operation 62) one or more of the links in the selected subset. The upper threshold for the selected enabled subset is determined in an operation 64. As already noted, the upper threshold is lower than the maximum rated capacity of the enabled links in the subset.

A determination 66 is made whether the enabled subset includes at least one secondary link. If the enabled subset includes at least one secondary link, that means there is a least one additional subset having a lower aggregate capacity than the currently selected subset. The upper threshold for the next smaller subset is determined in an operation 68.

If the enabled subset is not found to include at least one enabled secondary link, that means that only the primary link is currently enabled and there is no other subset in the defined link group having a lower aggregate capacity.

While the threshold determinations described above could be performed by reading the capacities of the enabled links in the subsets, in one embodiment of the invention, the threshold values would be determined as part of the initialization process for the link group and stored in memory in a component such as a link group memory.

Once the initial enabled subset is established and the appropriate threshold value or values have been determined, monitoring of the data traffic is begun (operation 70). The details of the algorithms used to monitor the data traffic are not essential to an understanding of the present invention. The monitoring may be performed on actual measurements of data traffic at key points in the computer network without storing any traffic measurements beyond those required to determine current actual data traffic levels "on the fly". Alternatively, traffic measurements made over predetermined periods of time may be stored in a suitable traffic history memory component to permit predictive traffic calculations to be performed. The use of predictive traffic calculations can enable the network owner to predict when secondary links in a defined link group need to be enabled or disabled for even more efficient energy utilization.

The operations illustrated in FIG. 7B assume data flow is detected on a "real time" basis. A periodic determination 72 is made whether the current data traffic level is greater than the upper threshold of the currently enabled subset of links in the defined link group. If the upper threshold is exceeded, a subsequent determination 74 is made whether all of the secondary links in the defined link group are already enabled, meaning that the link group is already operating at its maximum aggregate capacity. If it is determined that all of the secondary links are already enabled, an alert is sent (operation 76) to a network administrator to provide a warning that the defined link group may soon become incapable of handling the data traffic allocated to the link group. Once alerted, the network administrator may be able to reassign the data traffic to a larger available link group or to redefine the current link group to include one or more additional secondary links or take other similar actions.

If, however, determination 74 shows that the defined link group still contains one or more disabled secondary links, then one of those links is enabled in operation 78 before returning to the traffic monitoring mode.

If determination 72 shows that the measured traffic does not exceed the upper threshold of the currently enabled link group subset, it must be determined (operation 80) whether the measured traffic has fallen to a level below the upper threshold of the next smaller subset of links in the defined link group. If operation 80 shows that the traffic level has fallen below the threshold for the next smaller subset, a determination 82 is made whether the current enabled subset contains any active (enabled) secondary links. The only case in which determination 82 yields a negative result is where the current enabled subset already consists of only the primary link.

Assuming there is at least one enabled secondary link in the currently enabled subset, a secondary link is disabled in operation 84 to select a new, smaller subset of enabled links. The system then returns to a data traffic monitoring mode of operation.

Figure 8:
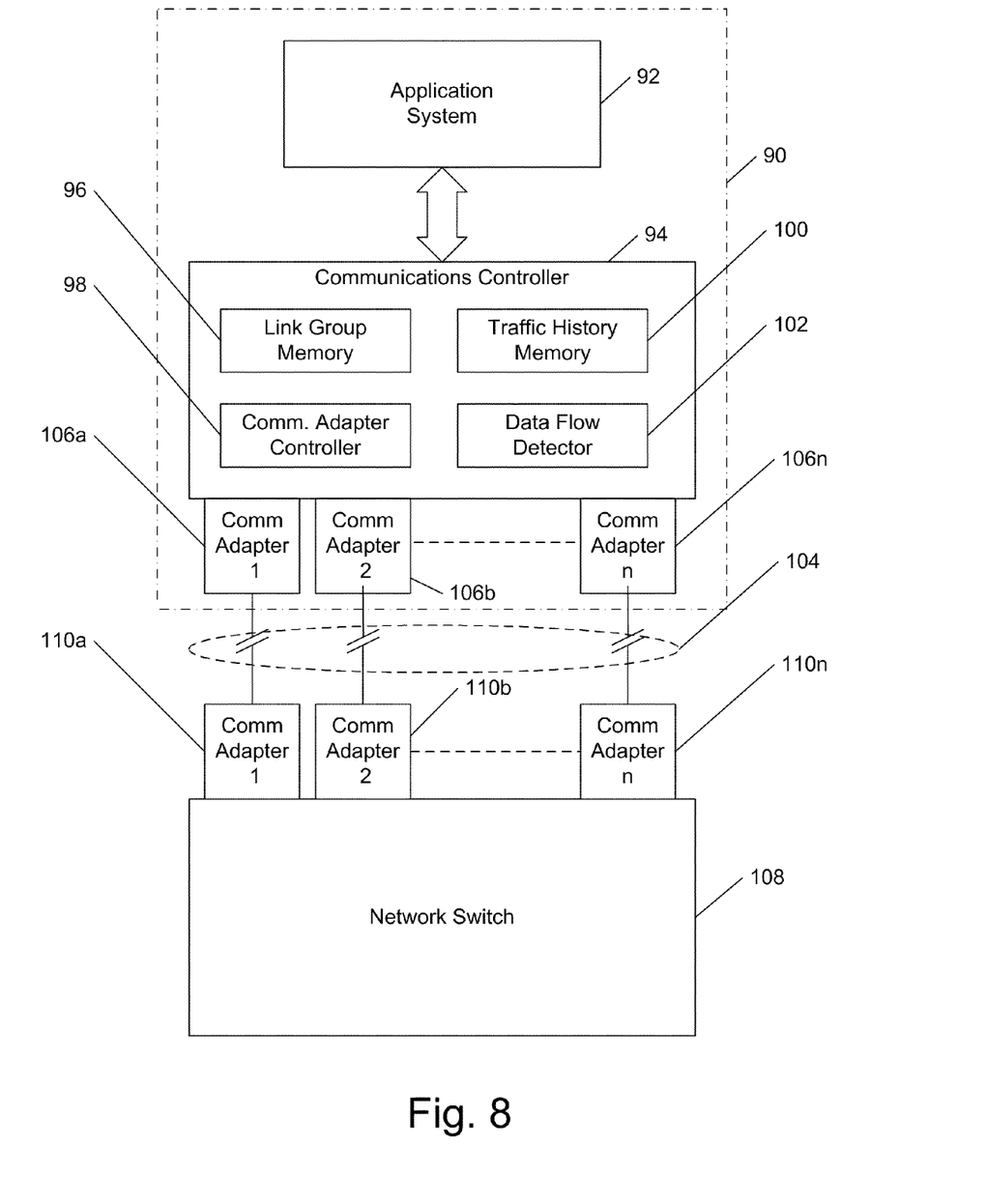
FIG. 8 is a schematic representation of components that would appear in a hardware-oriented embodiment of the invention.

The invention may be embodied in different ways. FIG. 8 is a schematic illustration of a hardware-oriented embodiment in a host system 90. The host system 90 includes an application system 92 which includes one or processors, an operating system and general memory and input/output components (not individually illustrated) capable of supporting execution of data-generating and/or data-consuming applications. Host system 90 also includes a communications controller component 94 which controls the flow of data over a set 104 of parallel data links between the host system 90 and another network device, shown for purposes of illustration as a network switch 108. The communications controller interfaces with the set 104 of parallel data links through communication adapters 106a, 106b, . . . , 106n. Similarly, the network switch interfaces with the set 104 through communications adapters 110a, 110b, . . . , 110n.

It should be understood that a network switch is shown only as one example of a network device that might be used in implementing an embodiment of the invention. It should also be understood that the references to Ethernet links does not mean that the present invention is limited to Ethernet systems. The present invention may be employed in any system where independently-controllable parallel data links are used to connect two network devices.

Communications controller 94, in a hardware-oriented embodiment of the invention, includes a link group memory 96 that may take the form of memory modules dedicated to storing the properties of individual data links, the definitions of link groups, the associations of link groups with particular data streams, and the like. The controller 94 may also include a traffic history memory 100 for storing traffic measurements over a predetermined period of time to support predictive calculations of data traffic. Memory 100 may also take the form of dedicated memory modules.

Communications controller 94 also includes a data flow detector 102 that may take the form of logic circuits capable of determining data traffic levels on either a predictive or a real time basis. Finally, communications controller 94 includes a communication adapter controller module 98 for controlling the enabled/disabled states of the individual communication adapters.

The communication adapter controller 98 can use standard commands already available in link aggregation standards to accomplish the enabling and disabling of individual links at runtime. For instance, the controller could issue ioctl commands to the secondary links to instruct them to enable or disable themselves.

Figure 9:
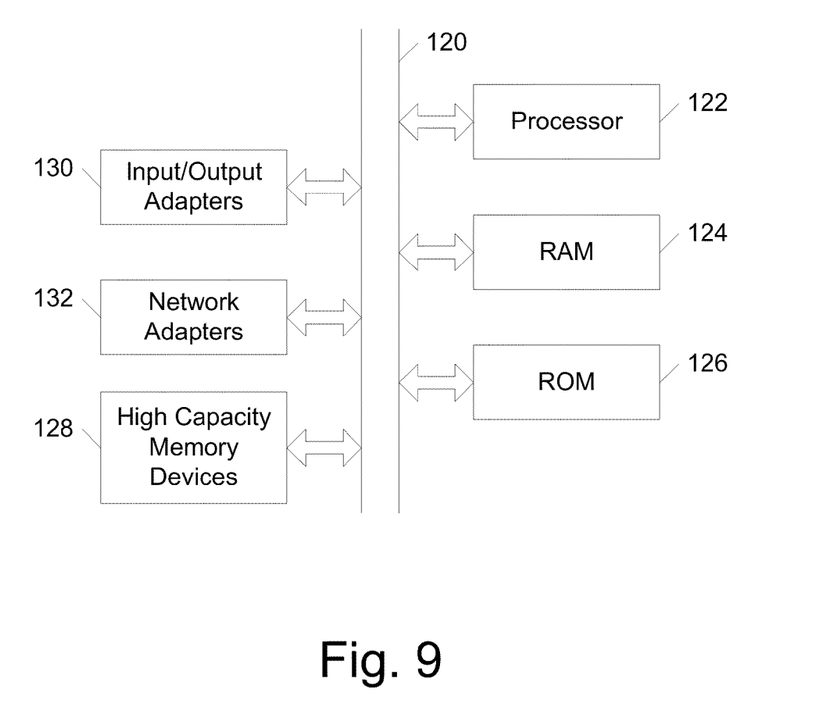
FIG. 9 is a schematic representation of a general purpose computer system that could be used in implementing another embodiment of the invention.

FIG. 9 is a block diagram of a hardware infrastructure for a general-purpose computer device that could, when programmed properly, be used to implement a different embodiment of the invention. The infrastructure includes a system bus 120 that carries information and data among a plurality of hardware subsystems including a processor 122 used to execute program instructions received from computer applications running on the hardware. The infrastructure also includes random access memory (RAM) 124 that provides temporary storage for program instructions and data during execution of computer applications and a read only memory (ROM) 126 often used to store program instructions required for proper operation of the device itself, as opposed to execution of computer applications. Long-term storage of programs and data is provided by high-capacity memory devices 128, such as magnetic hard drives or optical CD or DVD drives.

In a typical general purpose computer system, a considerable number of input/output devices are connected to the system bus 1120 through input/output adapters 130. Commonly used input/output devices include monitors, keyboards, pointing devices and printers. Increasingly, high capacity memory devices are being connected to the system through what might be described as general-purpose input/output adapters, such as USB or FireWire adapters. Finally, the system includes one or more network adapters 122 that are used to connect the system to other computer systems through intervening computer networks.

If such a system were programmed to implement an embodiment of the invention, the previously-discussed link group memory and traffic history memory would probably be implemented as storage locations in the high capacity memory devices 128 while the previously discussed communication adapter controller would probably be implemented through the control of network adapters 132. Similarly, the data flow detector would be implemented using the input/output adapters and the general processing capabilities of the processor 122 and the memories 124, 126 and 128.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of controlling data flow between network devices over parallel data links, each network device having a plurality of communications adapters, said method being performed in at least one of the network devices and comprising:
    defining a link group comprising a primary communication adapter and one or more secondary communication adapters;
    initializing the defined link group by enabling said primary communication adapter and disabling each of said secondary communication adapters;
    periodically determining the amount of data to be carried over links in said defined link group;
    in response to a determination that the amount of data to be carried satisfies a predetermined threshold condition related to the data capacity of said primary communication adapter, enabling one or more of said secondary communication adapters;
    in response to a determination that the amount of data to be carried over the links satisfies a threshold condition related to the combined data capacity of a subset of the set of enabled communication adapters in said defined link group, disabling at least one of said one or more of said secondary communication adapters in said defined link group;
    in response to a determination that the amount of data to be carried over the links in said defined link group satisfies a predetermined threshold condition related to the combined data capacity of all currently enabled communication adapters in said defined link group, enabling one or more additional secondary communication adapters in said defined link group; and
    repeating the above operation as necessary until all secondary communication adapters in said defined link group are enabled.

2. The computer-implemented method of claim 1 wherein periodically determining the amount of data to be carried over the data links in said defined link group further comprises:
    maintaining a history over a predetermined interval of time of the results of the periodic determinations of the amount of data to be carried over links in said defined link group; and
    executing a predictive algorithm using the maintained history to predict times at which the data flow will satisfy predetermined threshold conditions.

3. The computer-implemented method of claim 2 wherein each of said data links is an Ethernet link.

4. The computer-implemented method of claim 1, wherein said network devices comprise a first computer and a second computer and the links communicatively connect the first computer with the second computer, and said amount of data is to be carried between the first computer and the second computer.

5. The computer-implemented method of claim 1, further comprising:
    determining whether the amount of data to be carried satisfies the predetermined threshold condition related to the data capacity of said primary communication adapter; and
    determining whether the amount of data to be carried satisfies the predetermined threshold condition related to the combined data capacity of all currently enabled communication adapters.

6. A computer-implemented method controlling data flow between network devices over parallel data links, each network device having a plurality of communications adapters, said method being performed in at least one of the network devices and comprising:
    defining a link group comprising a primary communication adapter and one or more secondary communication adapters;
    initializing the defined link group by enabling said primary communication adapter and disabling each of said secondary communication adapters;
    periodically determining the amount of data to be carried over links in said defined link group; and
    in response to a determination that the amount of data to be carried satisfies a predetermined threshold condition related to the data capacity of said primary communication adapter, enabling one or more of said secondary communication adapters to carry said amount of data between the network devices using the primary communication adapter and one or more of said secondary communication adapters.

7. A computer program product for controlling data flow over parallel data links between network devices, each network device having a plurality of communications adapters, the computer program product comprising a non-transitory computer usable storage medium having computer usable program code stored thereon, the computer usable program code comprising:
    computer usable program code configured to define a link group comprising a primary communication adapter and one or more secondary communication adapters;
    computer usable program code configured to initialize the defined link group by enabling said primary communication adapter and disabling each of said secondary communication adapters;
    computer usable program code configured to periodically determine the amount of data to be carried over links in said defined link group;
    computer usable program code configured to, in response to a determination that the amount of data to be carried satisfies a predetermined threshold condition related to the data capacity of said primary communication adapter, enable one or more of said secondary communication adapters;
    computer usable program code configured to, in response to a determination that the amount of data to be carried over the parallel data links satisfies a threshold condition related to the combined data capacity of a subset of the set of enabled communication adapters in said defined link group, disable at least one of said one or more of said secondary communication adapters in the set of enable communication adapters in said defined link group;
    computer usable program code configured to, in response to a determination that the amount of data to be carried over the links in said defined link group satisfies a predetermined threshold condition related to the combined data capacity of all currently enabled communication adapters, enable one or more additional secondary communication adapters in said defined link group; and
    computer usable program code configured to cause the above operation to be repeated as necessary until all secondary communication adapters in said defined link group are enabled.

8. The computer program product of claim 7 wherein the computer usable program code configured to periodically determine the amount of data to be carried over the parallel data links in said defined link group further comprises:

computer usable program code configured to maintain a history over a predetermined interval of time of the results of the periodic determinations of the amount of data to be carried by links in said defined link group; and computer usable program code configured to execute a predictive algorithm using the maintained history to predict times at which the data flow will satisfy predetermined threshold conditions.

9. The computer program product of claim 8 wherein each of said data links is an Ethernet link.

10. The computer program product of claim 7, wherein said network devices comprise a first computer and a second computer and the links communicatively connect the first computer with the second computer, and said amount of data is to be carried between the first computer and the second computer.

11. The computer program product of claim 7, further comprising:

computer usable program code configured to determine whether the amount of data to be carried satisfies the predetermined threshold condition related to the data capacity of said primary communication adapter; and computer usable program code configured to determine whether the amount of data to be carried satisfies the predetermined threshold condition related to the combined data capacity of all currently enabled communication adapters.

12. A computer program product for controlling data flow over parallel data links between network devices, each network device having a plurality of communications adapters, the computer program product comprising a non-transitory computer usable storage medium having computer usable program code stored thereon, the computer usable program code comprising:

computer usable program code configured to define a link group comprising a primary communication adapter and one or more secondary communication adapters;

computer usable program code configured to initialize the defined link group by enabling said primary communication adapter and disabling each of said secondary communication adapters;

computer usable program code configured to periodically determine the amount of data to be carried over links in said defined link group; and computer usable program code configured to, in response to a determination that the amount of data to be carried satisfies a predetermined threshold condition related to the data capacity of said primary communication adapter, enable one or more of said secondary communication adapters to carry said amount of data between the network devices using the primary communication adapter and one or more of said secondary communication adapters.

13. A computer-implemented system comprising:

a link group memory for storing a definition of a link group as comprising a primary communication adapter and one or more secondary communication adapters;

a data flow detector for periodically detecting the amount of data to be carried over the link group defined in said link group memory;

a communication adapter controller for initializing the defined link group by enabling the primary communication adapter in said defined link group and disabling each of the secondary communication adapters in said defined link group; and in response to a determination by said data flow detector that the amount of data to be carried over said defined link group satisfies a predetermined threshold condition related to the data capacity of the primary communication adapter, enabling one or more of the secondary communication adapters.

14. The computer-implemented system of claim 13 wherein said communication adapter controller, in response to a determination by said data flow detector that the amount of data to be carried over said defined link group satisfies a predetermined threshold condition related to the combined data capacity of the set of enabled communication adapters in said defined link group, enables one or more of the secondary communication adapters in said defined link group.

15. The computer-implemented system of claim 14 wherein said communication adapter controller, in response to a determination by said data flow detector that the amount of data to be carried over said defined link group satisfies a predetermined threshold condition related to the combined data capacity of a subset of the set of enabled communication adapters in said defined link group, disables at least one of said one or more of the secondary communication adapters in said defined link group.

16. The computer-implemented system of claim 15 wherein said communication adapter controller further comprises a data flow memory device for maintaining a history over a predetermined time interval of the results of the periodic determinations of the amount of data to be carried over said defined link group and wherein said communication adapter controller executes a predictive algorithm using the maintained history to predict times at which the data flow will satisfy predetermined threshold conditions.

17. The computer-implemented system of claim 16 wherein each of the links in said defined link group is an Ethernet link.

18. The computer-implemented system of claim 13, wherein said network devices comprise a first computer and a second computer and the links communicatively connect the first computer with the second computer, and said amount of data is to be carried between the first computer and the second computer.

19. The computer-implemented system of claim 13, wherein the enabling of the one or more of said secondary communication adapters further comprises:

enabling said one or more of said secondary communication adapters to carry said amount of data between the network devices using the primary communication adapter and one or more of said secondary communication adapters.

* * * * *